(12) United States Patent
Okita et al.

(10) Patent No.: US 8,349,479 B2
(45) Date of Patent: Jan. 8, 2013

(54) BATTERY MOUNTING MECHANISM

(75) Inventors: Tetsuya Okita, Osaka (JP); Naritoshi Kagaya, Osaka (JP)

(73) Assignee: Panasonic Corporation, Osaka (JP)

( * ) Notice: Subject to any disclaimer, the term of this patent is extended or adjusted under 35 U.S.C. 154(b) by 947 days.

(21) Appl. No.: 12/418,874

(22) Filed: Apr. 6, 2009

(65) Prior Publication Data
US 2009/0258284 A1    Oct. 15, 2009

(30) Foreign Application Priority Data
Apr. 10, 2008  (JP) .................... 2008-102302

(51) Int. Cl.
*H01M 2/10* (2006.01)
(52) U.S. Cl. ............... 429/96; 429/97; 429/99; 429/100
(58) Field of Classification Search ............ 429/96, 429/97, 99, 100
See application file for complete search history.

(56) References Cited

U.S. PATENT DOCUMENTS
2008/0050650 A1* 2/2008 Hara et al. .............. 429/179

FOREIGN PATENT DOCUMENTS
JP    4-16869    2/1992

* cited by examiner

*Primary Examiner* — Jane Rhee
(74) *Attorney, Agent, or Firm* — Wenderoth, Lind & Ponack, L.L.P.

(57) ABSTRACT

A battery mounting mechanism includes a terminal connector, a first stopper, a second stopper, and a release button. The first stopper is disposed movably in the Z axis direction with respect to the terminal connector. The second stopper is disposed on the opposite side of the terminal connector with respect to the first stopper, and is disposed movably in the Z axis direction with respect to the terminal connector. The release button is arranged to release the restriction of the first battery or the restriction of the second battery by the first stopper, and arranged to drive the first stopper and the second stopper in the Z axis direction with respect to the terminal connector.

22 Claims, 13 Drawing Sheets

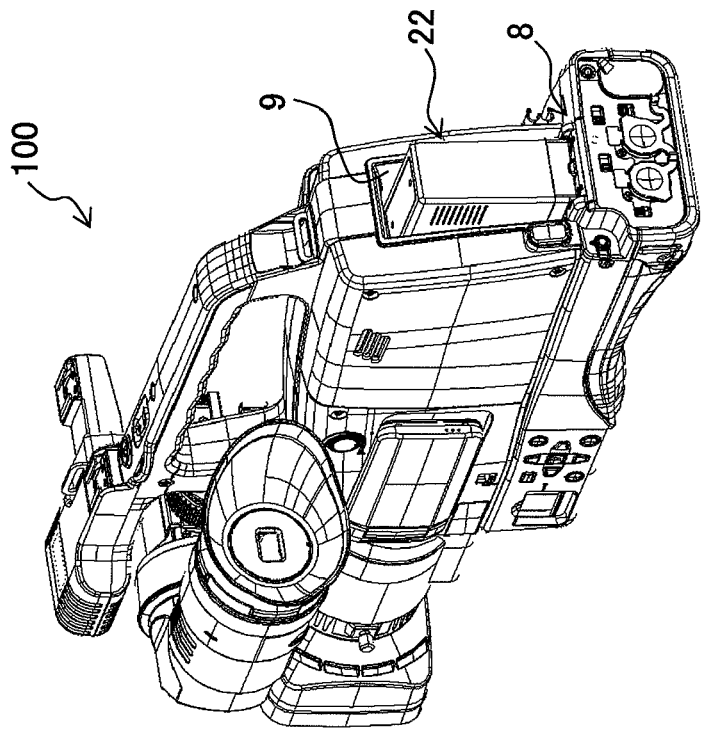
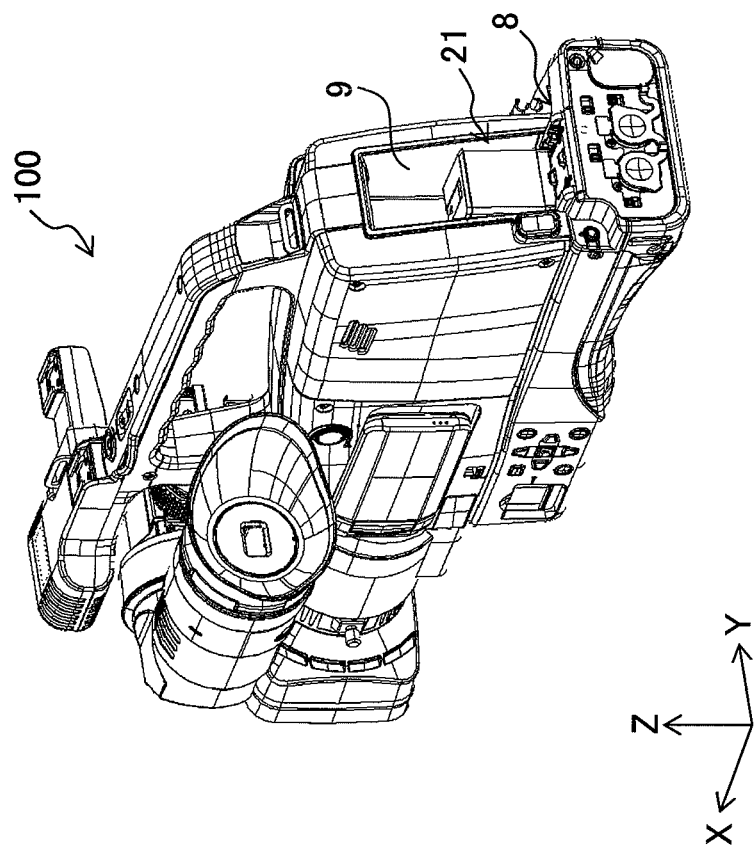

BATTERY MOUNTING MECHANISM

CROSS-REFERENCE TO RELATED APPLICATIONS

This application claims priority to Japanese Patent Application No. 2008-102302 filed on Apr. 10, 2008. The entire disclosure of Japanese Patent Application No. 2008-102302 is hereby incorporated herein by reference.

BACKGROUND

1. Technical Field

The technical field relates to a battery mounting mechanism for mounting batteries of different sizes in an apparatus main body.

2. Description of the Related Art

Special batteries have been used in video cameras and other such imaging devices in recent years. For instance, rechargeable batteries that are commonly used for video cameras come in different sizes depending on their capacity, and there has been a practical need for a mechanism with which batteries of different sizes can be mounted. Also, a structure for directly mounting batteries on the outside of a video camera housing has been employed as a battery mounting mechanism for commercial-use video cameras so that the batteries can be replaced more easily.

For example, the mechanism described in Japanese Laid-Open Utility Model Application H4-16869 has been proposed as this type of battery mounting mechanism. This battery mounting mechanism includes a box-shaped main body, a first support member, a second support member, a latching member, and a release member.

The main body has a lid that can be opened and closed. The first support member individually supports the bottoms of a first battery and a second battery that have different sizes. The second support member restricts the upper face of the first battery and the two side faces of the second battery. The latching member is provided on the inside of the main body, and restricts upward movement of the first and second batteries. The release member releases the restriction of movement of the first and second batteries by the latching member.

With the above-mentioned conventional configuration, however, when the first battery is removed, restriction of the first battery by the support members and the latching member must be released. Also, when the second battery is removed, restriction the second battery by the support members and the latching member must be released. In other words, although batteries of different sizes can be mounted with this battery mounting mechanism, removing the batteries involves a lot of work.

SUMMARY

A technology described below provides a battery mounting mechanism with which batteries of different sizes can be mounted, and the batteries are easy to remove.

A battery mounting mechanism according to an aspect is a mechanism for mounting batteries of different sizes in an apparatus main body, comprising a first contact part, a first support member, a second support member, and a release member. The first contact part is fixed to the apparatus main body and is able to come into contact with the apparatus main body in a first direction. The first support member is a member arranged to restrict movement of the battery in the first direction with respect to the apparatus main body along with the first contact part, and is disposed movably in a second direction perpendicular to the first direction with respect to the first contact part. The second support member is a member arranged to restrict movement of the battery in the first direction with respect to the apparatus main body along with the first contact part, and is disposed movably in the second direction with respect to the first contact part. The release member is arranged to release the restriction of the battery by the first support member or the restriction of the battery by the second support member, and is able to drive the first support member and the second support member in the second direction with respect to the first contact part.

When a first battery is mounted in the apparatus main body via the battery mounting mechanism, movement of the first battery in the first direction with respect to the apparatus main body is restricted by the first contact part and the first support member. When the release member is operated, the first support member is driven in the second direction with respect to the apparatus main body, so the restriction of the first battery by the first support member is released and the battery can be removed of the apparatus main body.

When a second battery that is different in size from the first battery is mounted in the apparatus main body via the battery mounting mechanism, the first contact part and the second support member restrict movement of the second battery in the first direction with respect to the apparatus main body. When the release member is operated, the second support member is driven in the second direction with respect to the apparatus main body, so the restriction of the second battery by the second support member is released, and the second battery can be removed of the apparatus main body.

Thus, with this battery mounting mechanism, batteries of different sizes can be mounted, and the removal of the batteries can be easily accomplished with the release member.

BRIEF DESCRIPTION OF THE DRAWINGS

Referring now to the attached drawings which form a part of this original disclosure:

FIG. 2A is a simplified perspective view of a video camera (with a first battery);

FIG. 2B is a simplified perspective view of a video camera (with a second battery);

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Overview of Battery Mounting Mechanism

A battery mounting mechanism 8 is a mechanism for allowing two batteries of different size to be mounted in a video camera or other such device. An overview of the battery mounting mechanism 8 will be described, using a commercial video camera 100 (an example of the apparatus main body) as an example of the device in which the battery mounting mechanism 8 is mounted.

Figure 1:
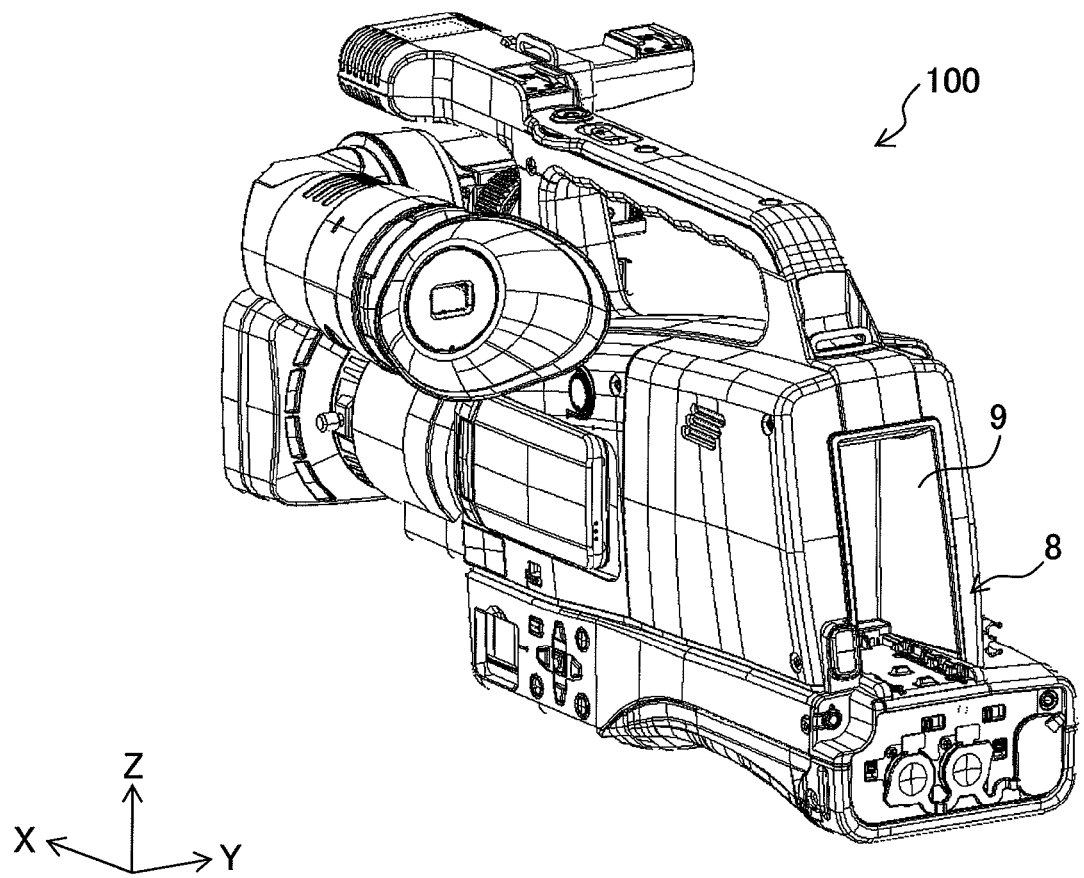
FIG. 1 is a simplified perspective view of a video camera (with no battery)

FIGS. 1, 2A, and 2B are perspective views of the video camera 100. FIG. 1 shows the state when a battery has not been mounted in the video camera 100. FIG. 2A shows the state when a first battery 21 has been mounted in the video camera 100, and FIG. 2B shows the state when a second battery 22 that is larger than the first battery 21 has been mounted in the video camera 100.

As shown in FIGS. 1 and 2, in this embodiment a perpendicular coordinate system is set with respect to the video camera 100. The X axis direction in the drawings (an example of the first direction) is the forward and backward direction in the usage state of the video camera 100, the Y axis direction is the left and right direction, and the Z axis direction is the up and down direction (an example of the second direction). The X axis direction positive side is the front side, the Y axis direction positive side is the right side of the video camera 100 as viewed from behind, and the Z axis direction positive side is the upper side.

As shown in FIGS. 1 and 2, the battery mounting mechanism 8 is installed at the rear part of the video camera 100. More specifically, a recess 9 that accommodates a battery is provided at the rear part of the video camera 100, and the battery mounting mechanism 8 is disposed on the bottom part of the recess 9. The recess 9 opens to the rear (the X axis direction negative side) so that the battery can be removed to the rear.

Figure 3A:
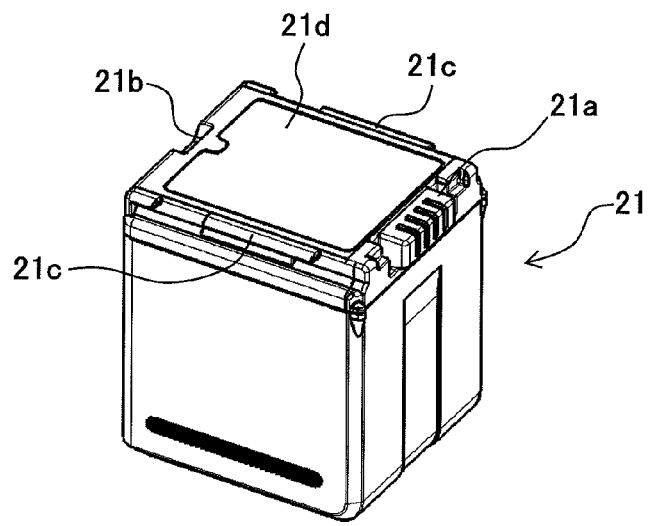
FIG. 3A is a simplified perspective view of a first battery
Figure 3B:
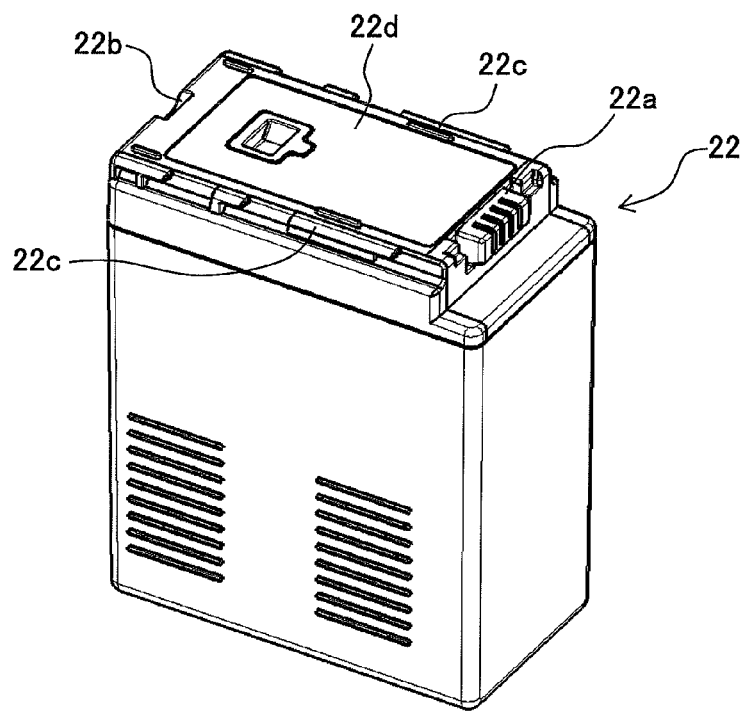
FIG. 3B is a simplified perspective view of a second battery.

As shown in FIGS. 2A and 2B, the battery mounting mechanism 8 allows batteries of two different shapes to be mounted in the video camera 100. More specifically, the first battery 21 shown in FIG. 3A and the second battery 22 shown in FIG. 3B can be mounted in the battery mounting mechanism 8. As shown in FIGS. 3A and 3B, the first battery 21 and the second battery 22 are different kinds of battery, with the second battery 22 being larger than the first battery 21, and more specifically, when mounted in the video camera 100, the second battery 22 is longer than the first battery 21 in the X axis direction and the Z axis direction.

Battery Configuration

The configuration of the first battery 21 and the second battery 22 will now be described.

The first battery 21 and the second battery 22 are rechargeable batteries, for example. When the first battery 21 or the second battery 22 is brought into electrical contact with a terminal connector 19 (discussed below) of a base plate 1, power is supplied from the first battery 21 or the second battery 22 to the various components of the video camera 100.

As shown in FIG. 3A, the first battery 21 has a terminal part 21a, a first latched portion 21b, a pair of second latched portions 21c, and a bottom face 21d. The terminal part 21a has contacts for making electrical contact with the terminal connector 19. In a state in which the first battery 21 is mounted in the battery mounting mechanism 8, the terminal part 21a is in contact with the terminal connector 19 in the X axis direction. When the terminal part 21a comes into contact with the terminal connector 19, the first battery 21 is positioned in the X axis direction with respect to the video camera 100.

The first latched portion 21b is a portion that comes into contact with a first stopper 41 (discussed below) of the battery mounting mechanism 8 in the X axis direction. The second latched portions 21c are portions that are latched by a pair of latching portions 13 (discussed below) of the base plate 1, and are provided one each to the left and right ends of the bottom face 21d of the first battery 21. The bottom face 21d comes into contact with a plate main body 11 (discussed below) of the base plate 1 when the first battery 21 is mounted in the battery mounting mechanism 8.

As shown in FIG. 3B, the second battery 22 has a terminal part 22a, a first latched portion 22b, a pair of second latched portions 22c, and a bottom face 22d. The terminal part 22a has contacts for making electrical contact with the terminal connector 19. In a state in which the second battery 22 is mounted in the battery mounting mechanism 8, the terminal part 22a is in contact with the terminal connector 19 in the X axis direction. When the terminal part 22a comes into contact with the terminal connector 19, the second battery 22 is positioned in the X axis direction with respect to the video camera 100.

The first latched portion 22b is a portion that comes into contact with a second stopper 42 (discussed below) of the battery mounting mechanism 8 in the X axis direction. The second latched portions 22c are portions that are latched by the pair of latching portions 13 of the base plate 1, and are provided one each to the left and right ends of the bottom face 22d of the second battery 22. The bottom face 22d comes into contact with a plate main body 11 (discussed below) of the base plate 1 when the second battery 22 is mounted in the battery mounting mechanism 8.

Configuration of Battery Mounting Mechanism

The battery mounting mechanism 8 has the following configuration so that the above-mentioned two kinds of battery, namely, the first battery 21 and the second battery 22, can be mounted in the video camera 100. The battery mounting mechanism 8 will be described through reference to FIGS. 4 to 12B.

Figure 4:
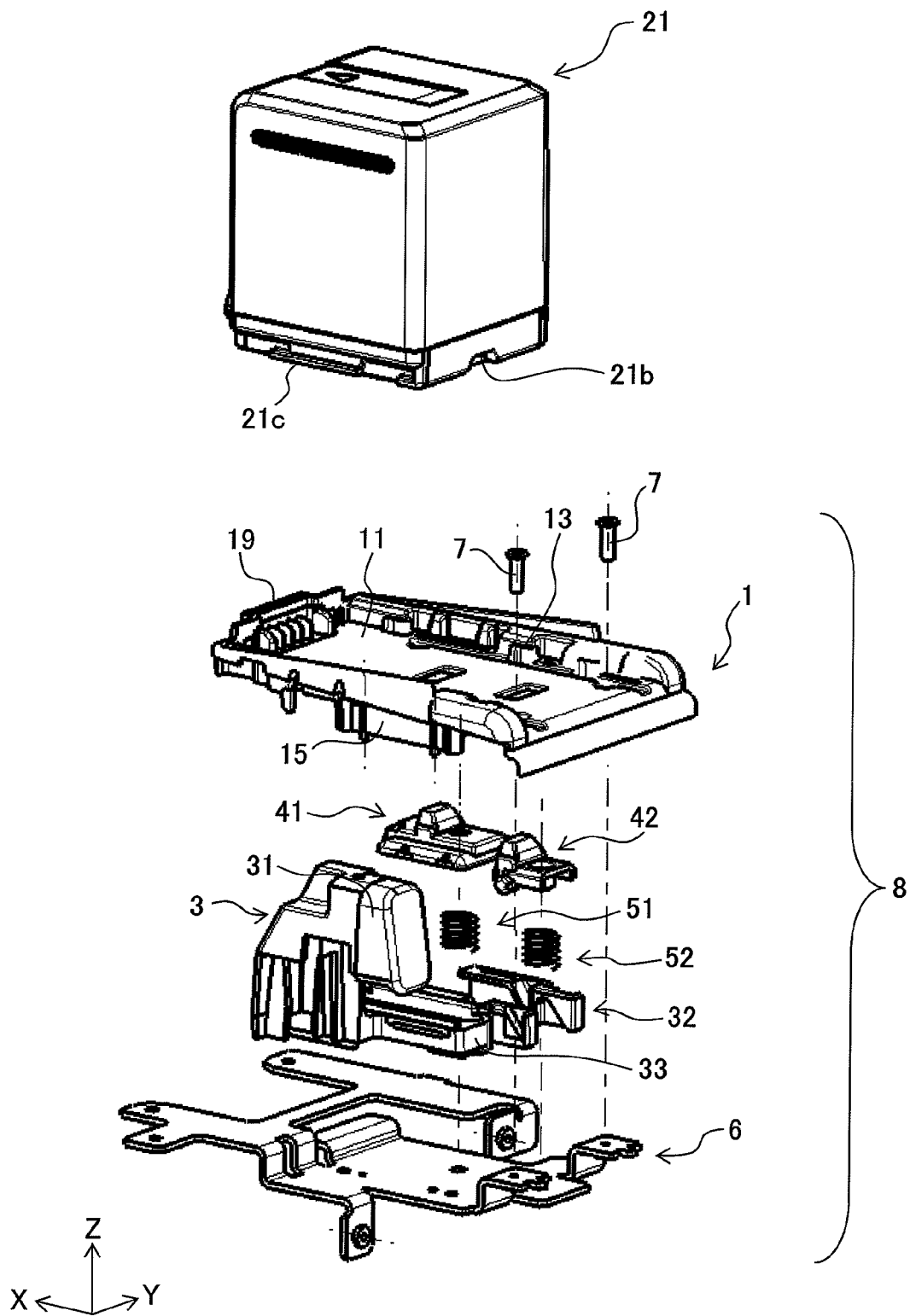
FIG. 4 is an exploded perspective view of a battery mounting mechanism.
Figure 5:
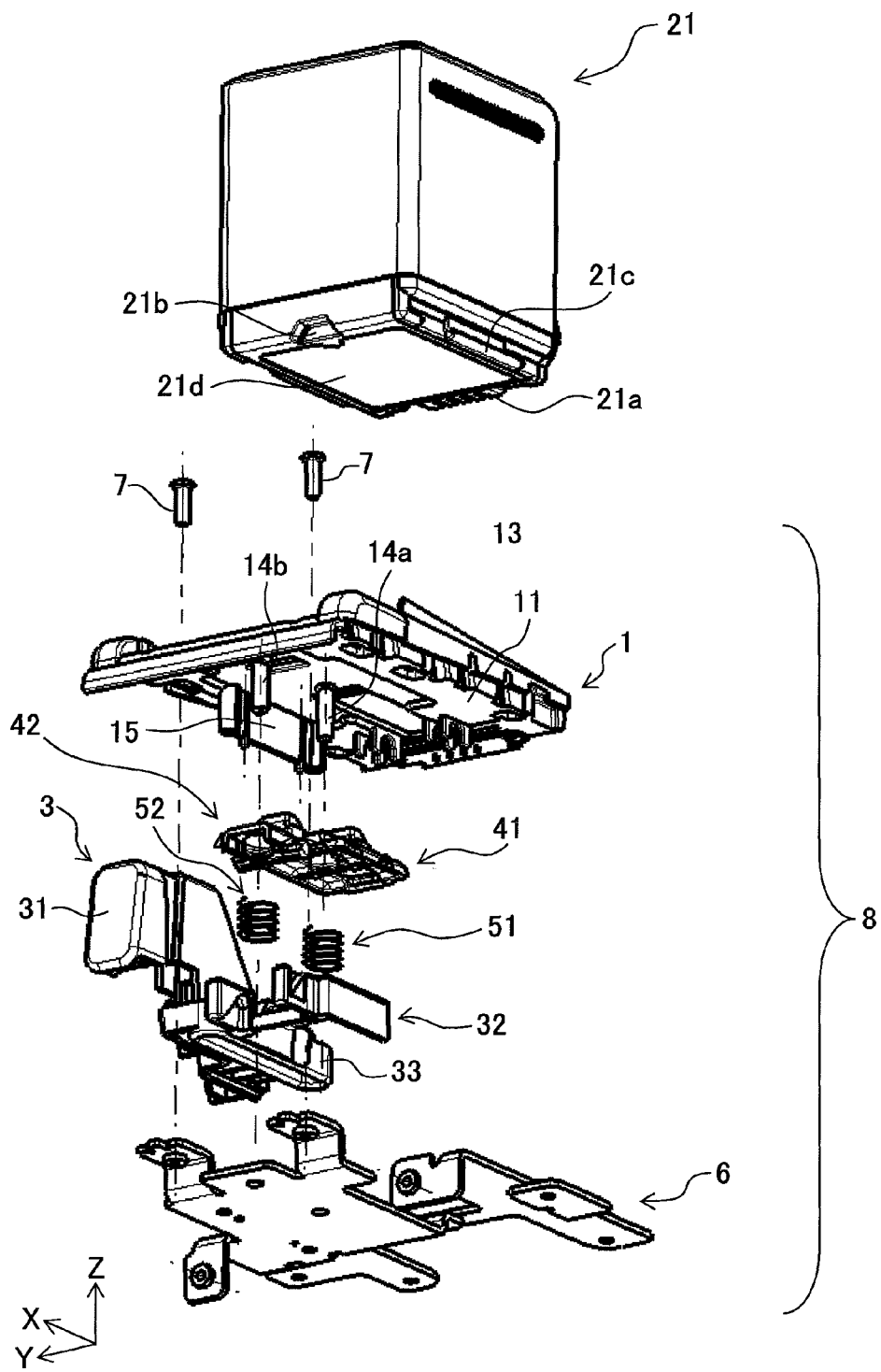
FIG. 5 is an exploded perspective view of a battery mounting mechanism.
Figure 6A:
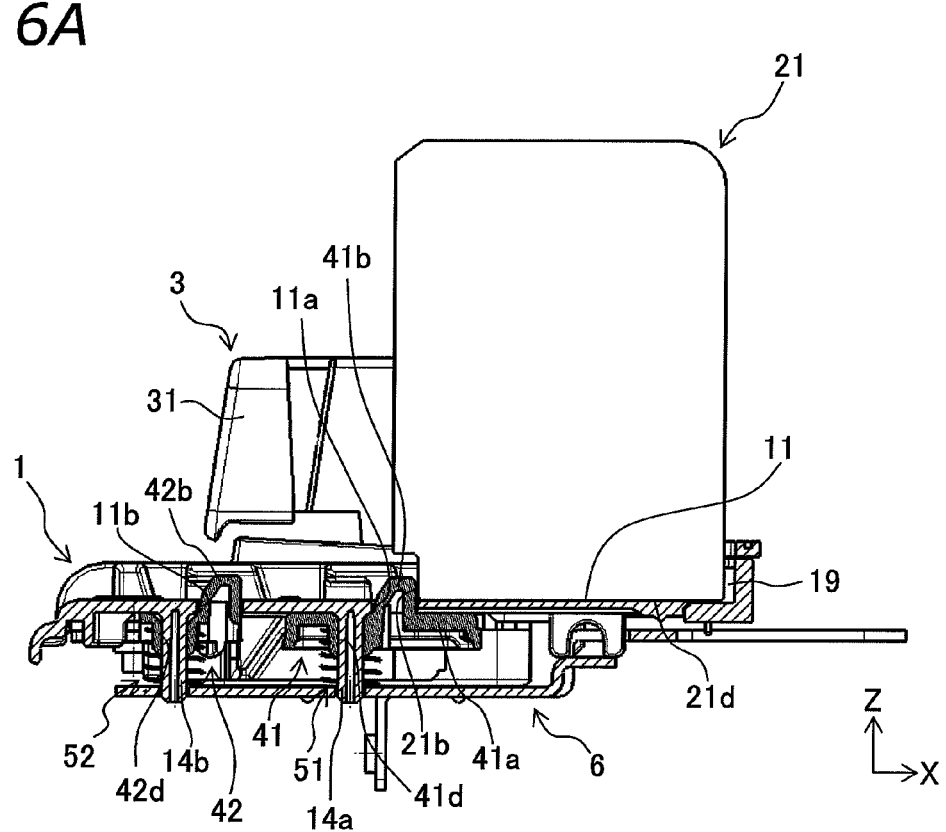
FIGS. 6A and 6B are cross-sectional views of a battery mounting mechanism (FIG. 6A is with the first battery mounted)
Figure 6B:
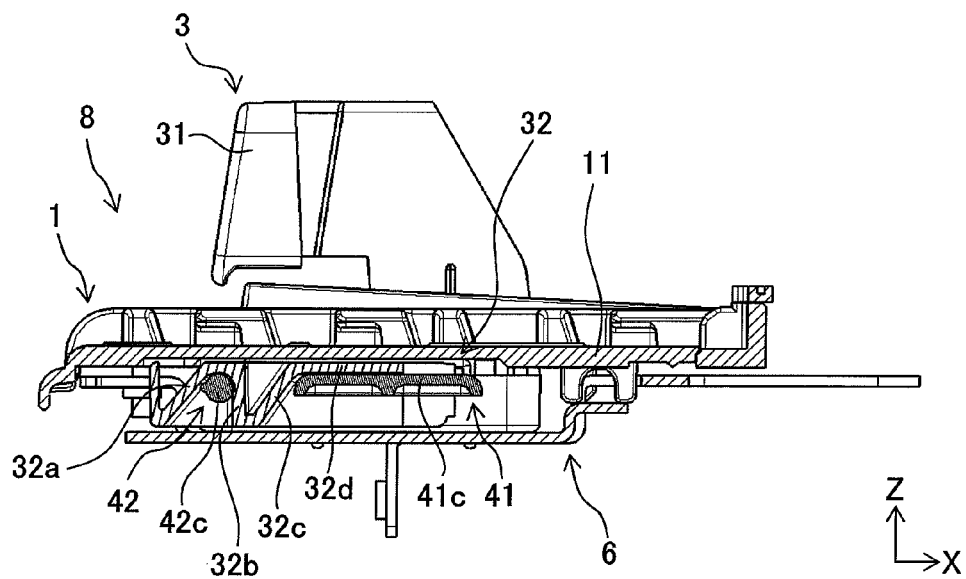
Figure 7A:
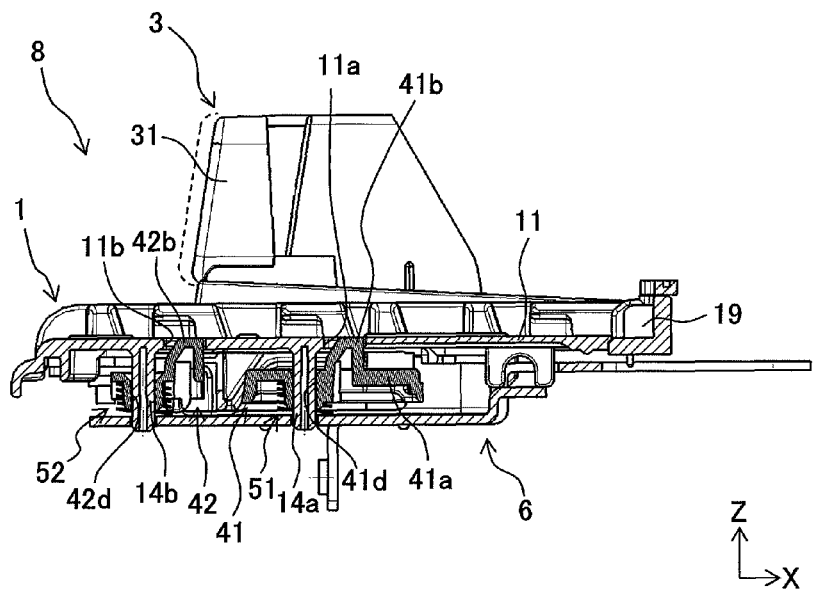
FIGS. 7A and 7B are cross-sectional views of a battery mounting mechanism (battery removal)
Figure 7B:
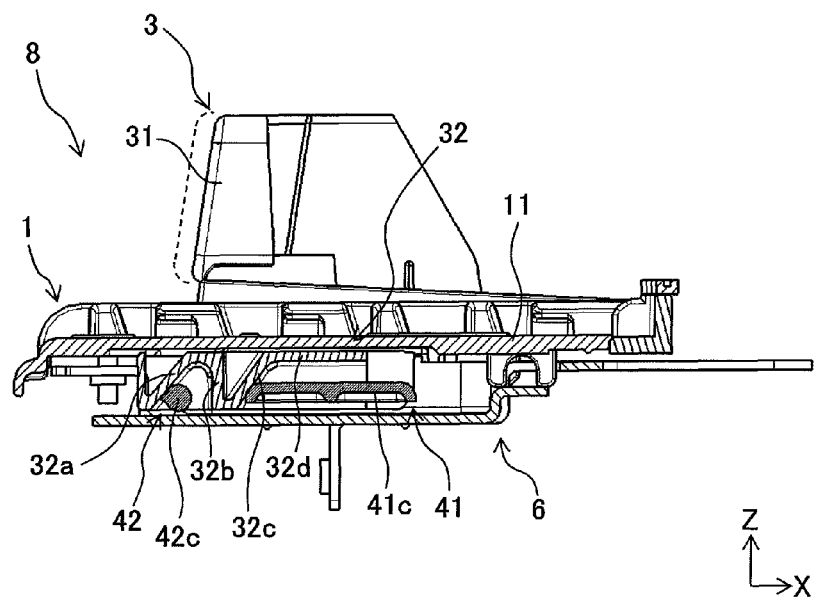
Figure 8:
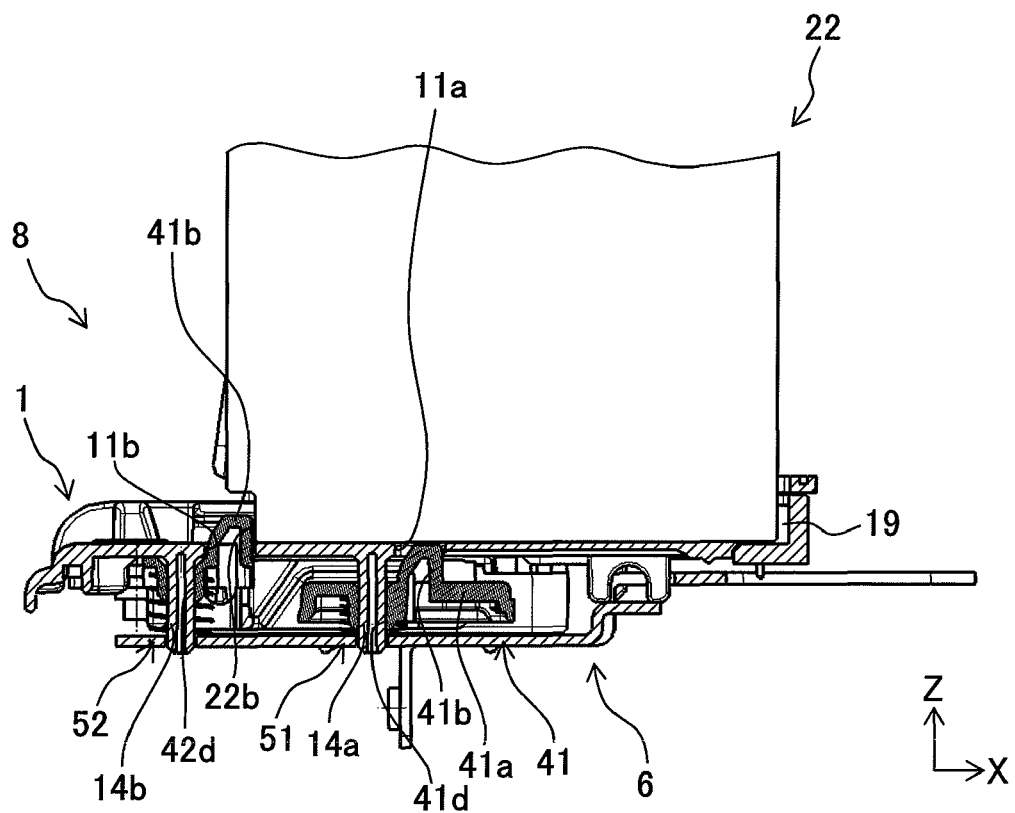
FIG. 8 is a cross-sectional view of a battery mounting mechanism (second battery mounting)
Figure 9B:
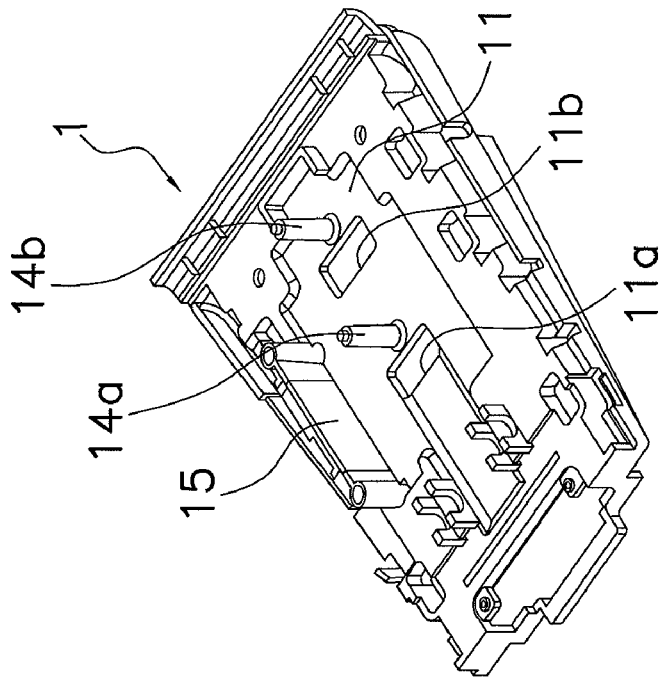
FIGS. 9A and 9B are perspective views of a base plate.
Figure 9A:
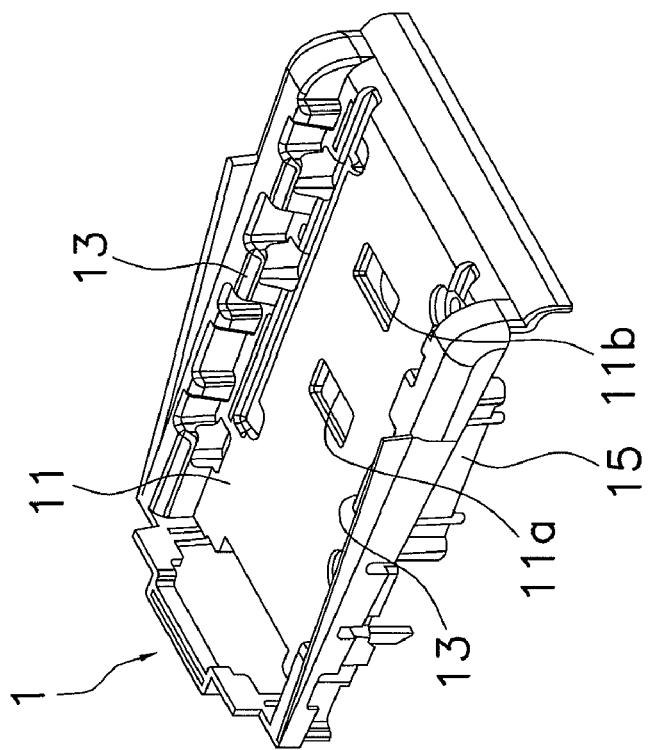
Figure 10B:
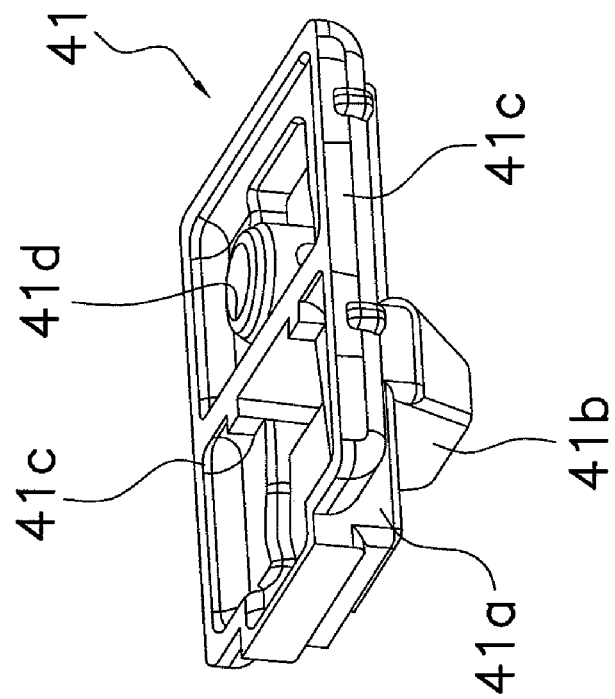
FIGS. 10A and 10B are perspective views of a first stopper.
Figure 10A:
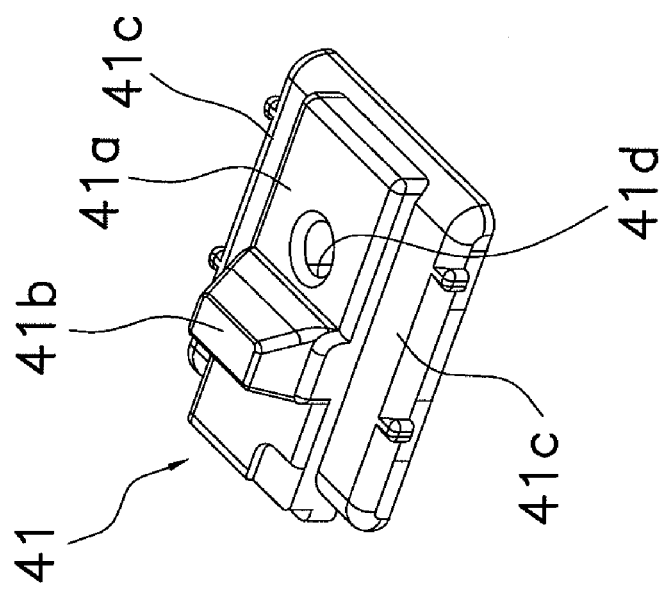
Figure 11B:
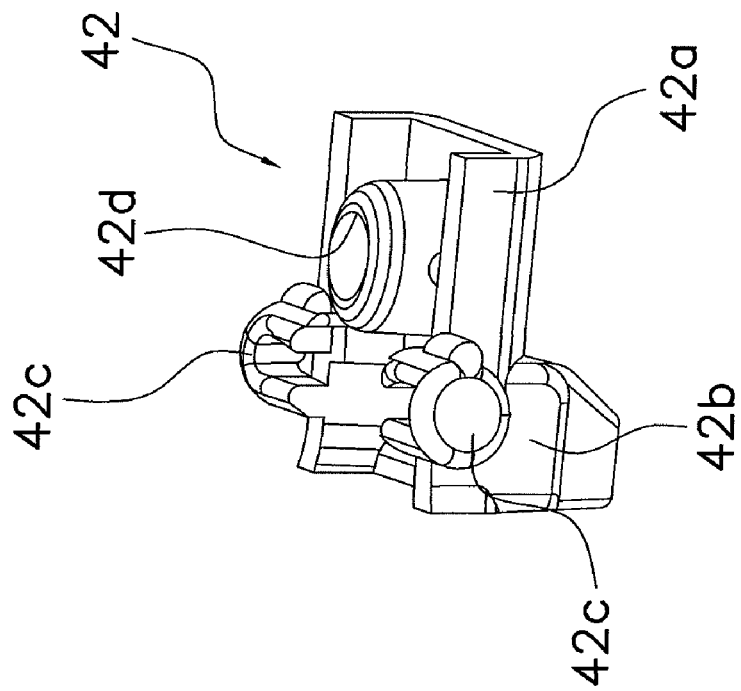
FIGS. 11A and 11B are perspective views of a second stopper.
Figure 11A:
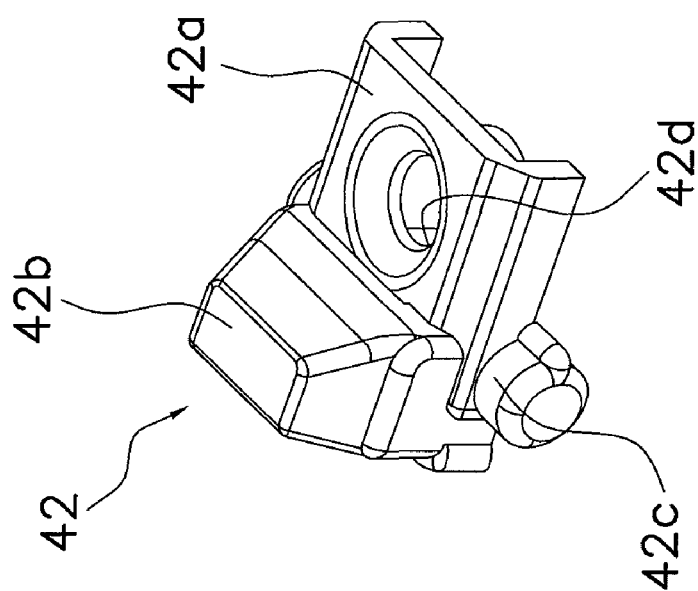
Figure 12B:
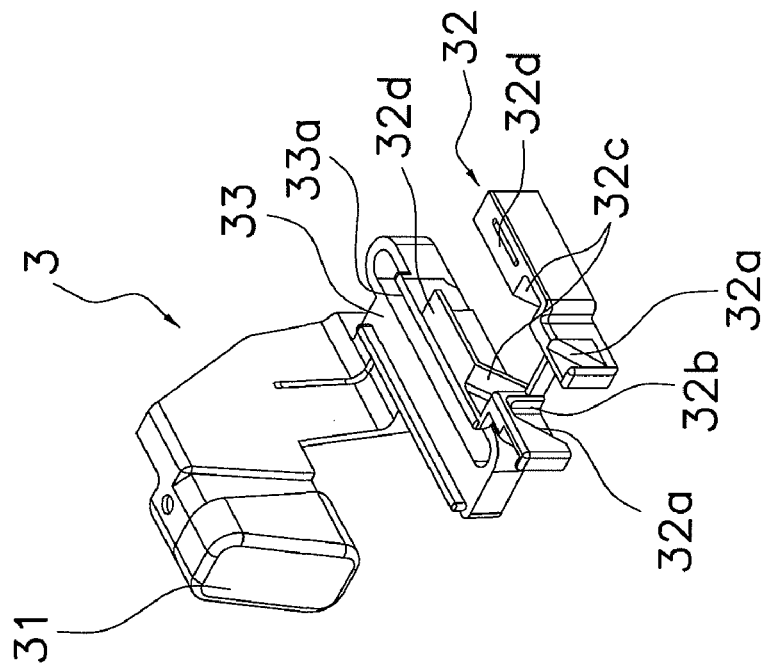
FIGS. 12A and 12B are perspective views of a release button.
Figure 12A:
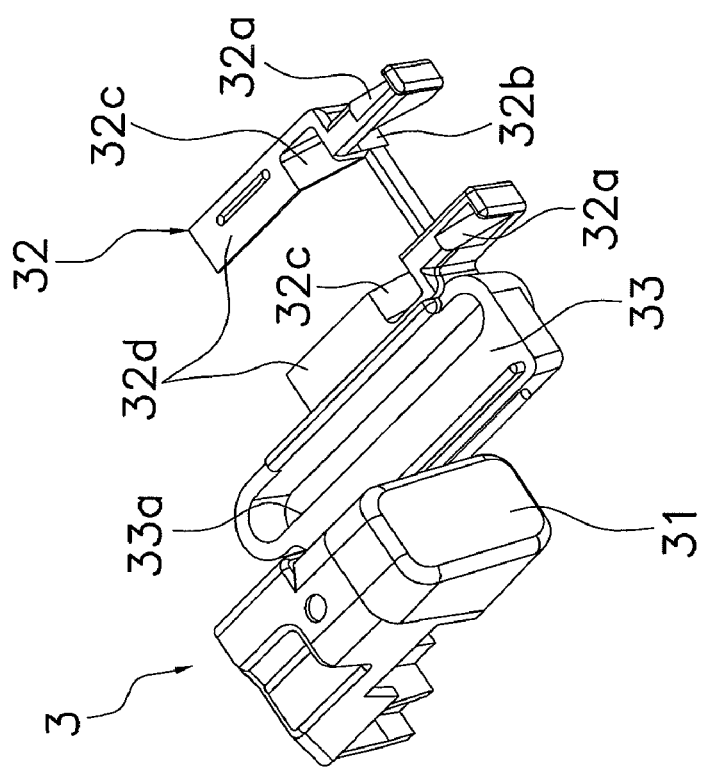
Figure 13:
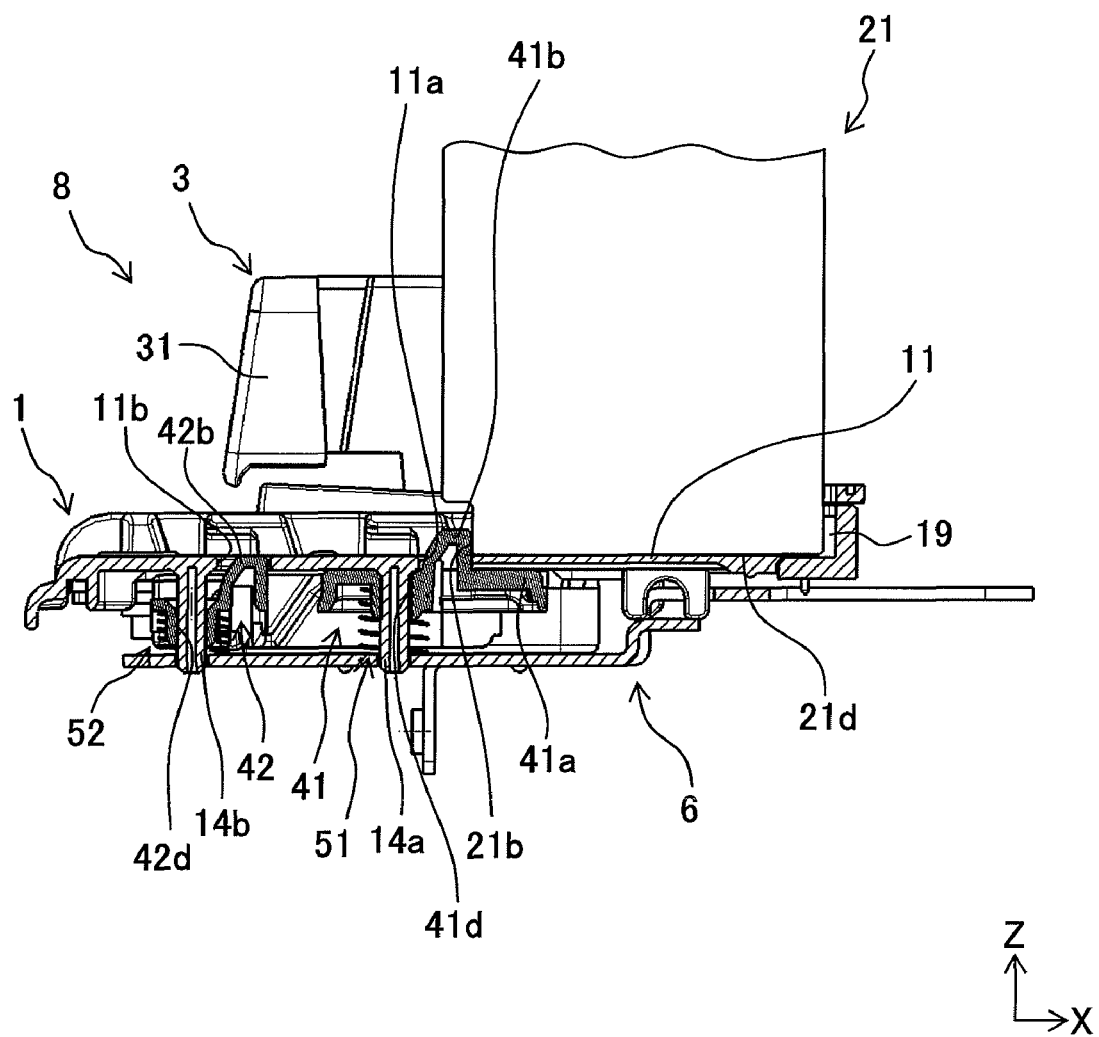
FIG. 13 is a cross-sectional view of a battery mounting mechanism.

FIGS. 4 and 5 are exploded perspective views of the battery mounting mechanism 8. FIGS. 4 and 5 are views of the various components of the battery mounting mechanism 8 as seen from different perspectives. FIGS. 6A to 8 are cross-sectional views of the battery mounting mechanism 8. FIG. 6A shows the state when the first battery 21 is mounted. FIGS. 6A and 6B are cross-sectional views at different locations. FIGS. 7A and 7B show the state when a release button 3 is pressed. FIGS. 7A and 7B are cross-sectional views at different locations. FIG. 8 shows the state when the second battery 22 is mounted. FIGS. 9A and 9B are perspective views of the base plate 1. FIGS. 10A and 10B are perspective views of the first stopper 41. FIGS. 11A and 11B are perspective views of the second stopper 42. FIGS. 12A and 12B are perspective views of the release button 3. FIG. 13 is a cross-sectional view of the battery mounting mechanism 8.

As shown in FIGS. 4 and 5, the battery mounting mechanism 8 includes the base plate 1, the first stopper 41 (an example of the first support member), the second stopper 42 the second support member), a first spring 51 (an example of the first pressing member), a second spring 52 (an example of the second pressing member), the release button 3 (an example of the release member), and a support plate 6.

(1) Base Plate

The base plate 1 constitutes part of the housing of the video camera 100, and is the portion where the first battery 21 and second battery 22 are placed. The base plate 1 is located parallel to the X axis direction. The "lower side" of the base plate 1 (the Z axis direction negative side) means the interior of the housing of the video camera 100.

As shown in FIGS. 4 to 9B, the base plate 1 has the plate main body 11 (an example of the second contact part), the terminal connector 19 (an example of the first contact part), the pair of latching portions 13, a first guide shaft 14a (an example of the first guide member), a second guide shaft 14b (an example of the second guide member), and a guide plate 15. The terminal connector 19 is not shown in FIGS. 6A and 6B.

The plate main body 11 is a portion that supports the first battery 21 and the second battery 22 in the Z axis direction, and has a first opening 11a and a second opening 11b. A first protrusion 41b (discussed below) of the first stopper 41 is inserted in the first opening 11a, and a second protrusion 42b (discussed below) of the second stopper 42 is inserted in the second opening 11b.

The terminal connector 19 is a portion that makes electrical contact with the terminal part 21a of the first battery 21 or the terminal part 22a of the second battery 22, and is fixed to the end on the front side (the X axis direction positive side) of the plate main body 11. The terminal connector 19 restricts movement of the first battery 21 or the second battery 22 to the X axis direction positive side with respect to the video camera 100. In other words, the first battery 21 or the second battery 22 is positioned in the X axis direction by the terminal connector 19.

The latching portions 13 are provided one each to the left and right ends of the plate main body 11. The second latched portions 21c of the first battery 21 mate with the latching portions 13 when the first battery 21 is mounted. The latching portions 13 restrict movement of the first battery 21 in the Y axis direction and the Z axis direction with respect to the base plate 1, and position the first battery 21 in the Y axis direction and the Z axis direction with respect to the base plate 1.

Also, the second latched portions 22c of the second battery 22 mate with the latching portions 13 when the second battery 22 is mounted. The latching portions 13 restrict movement of the second battery 22 in the Y axis direction and the Z axis direction with respect to the base plate 1, and position the second battery 22 in the Y axis direction and the Z axis direction with respect to the base plate 1.

The first guide shaft 14a is a portion that guides the first stopper 41 in the Z axis direction, and protrudes from the plate main body 11 on the opposite side from the battery (the housing interior side). The second guide shaft 14b is a portion that guides the second stopper 42 in the Z axis direction, and protrudes from the plate main body 11 on the opposite side from the battery (the housing interior side). The first guide shaft 14a and the second guide shaft 14b are disposed next to each other in the X axis direction.

The guide plate 15 is a portion that is roughly in the form of a plate and guides the release button 3 in the X axis direction, and protrudes from the plate main body 11 on the opposite side from the battery (the housing interior side).

(2) First Stopper and First Spring

As shown in FIGS. 4 to 8 and FIGS. 10A and 10B, the first stopper 41 is arranged to restrict movement of the first battery 21 with respect to the base plate 1, and is disposed apart from the terminal connector 19 in the X axis direction. The first stopper 41 is disposed between the second stopper 42 (discussed below) and the terminal connector 19.

The first stopper 41 has a first main body 41a, a first protrusion 41b, and a pair of side portions 41c. The first main body 41a has a first hole 41d into which the first guide shaft 14a is inserted. Since the first guide shaft 14a is inserted in the first hole 41d, the first stopper 41 is slidable in the Z axis direction with respect to the plate main body 11. The first protrusion 41b is a portion that comes into contact with the first latched portion 21b of the first battery 21, and protrudes from the first main body 41a. The first protrusion 41b is inserted into the first opening 11a.

In a state in which the first protrusion 41b is inserted into the first opening 11a, the first protrusion 41b (more precisely, the point of contact between the first battery 21 and the first protrusion 41b) is disposed more to the terminal connector 19 side than the first guide shaft 14a.

The side portions 41c are a portion guided by a first guide portion 32 (discussed below) of the release button 3.

As shown in FIGS. 4 to 8, the first spring 51 is a member that biases the first stopper 41 in the Z axis direction, and presses the first stopper 41 to the base plate 1 side (the Z axis direction positive side). The first spring 51 is inserted in the first guide shaft 14a, and is disposed in a pre-compressed state between the first stopper 41 and the support plate 6.

When the first stopper 41 has moved all the way to the Z axis direction positive side (upper side), the first protrusion 41b is in a state of protruding from the first opening 11a to outside the housing. When the first stopper 41 has moved all the way to the Z axis direction negative side (lower side), the first stopper 41 is in a state of being completely accommodated inside the housing, and the first protrusion 41b does not protrude from the first opening 11a. Since the first stopper 41 is pressed by the first spring 51 to the base plate 1 side (the Z axis direction positive side), ordinarily the first protrusion 41b protrudes outside the housing from the first opening 11a.

(3) Second Stopper and Second Spring

As shown in FIGS. 4 to 8 and FIGS. 11A and 11B, the second stopper 42 is arranged to restrict the movement of the second battery 22 with respect to the base plate 1, and is disposed on the opposite side from the terminal connector 19 with respect to the first stopper 41. The second stopper 42 has a second main body 42a, a second protrusion 42b, and a pair of shaft portions 42c. The second main body 42a has a second hole 42d into which the second guide shaft 14b is inserted. Since the second guide shaft 14b is inserted in the second hole 42d, the second stopper 42 is slidable in the Z axis direction with respect to the plate main body 11. The second protrusion 42b is a portion that comes into contact with the first latched portion 22b of the second battery 22, and protrudes from the second main body 42a. The second protrusion 42b is inserted into the second opening 11b.

In a state in which the second protrusion 42b is inserted into the second opening 11b, the second protrusion 42b (more precisely, the point of contact between the first battery 21 and the second protrusion 42b) is disposed more to the terminal connector 19 side than the second guide shaft 14b.

The shaft portions 42c are a portion guided by the first guide portion 32 of the release button 3.

As shown in FIGS. 4 to 8, the second spring 52 is a member that biases the second stopper 42 in the Z axis direction, and presses the second stopper 42 (more precisely, the second main body 42*a*) to the base plate 1 side (the Z axis direction positive side). The second spring 52 is inserted in the second guide shaft 14*b*, and is disposed in a pre-compressed state between the support plate 6 and the second stopper 42.

When the second stopper 42 has moved all the way to the Z axis direction positive side (upper side), the second protrusion 42*b* is in a state of protruding from the second opening 11*b* to outside the housing. When the second stopper 42 has moved all the way to the Z axis direction negative side (lower side), the second stopper 42 is in a state of being completely accommodated inside the housing, and the second protrusion 42*b* does not protrude from the second opening 11*b*. Since the second stopper 42 is pressed by the first spring 51 to the base plate 1 side (the Z axis direction positive side), ordinarily the second protrusion 42*b* protrudes outside the housing from the first second opening 11*b*.

The first stopper 41 and the second stopper 42 are each independently movable in the Z axis direction with respect to the base plate 1.

(3) Release Button

The release button 3 is arranged to release the restriction of the first battery 21 by the first stopper 41 or the restriction of the second battery 22 by the second stopper 42, and is operated by the user when the first battery 21 or the second battery 22 is removed. More specifically, the release button 3 has a controller 31, the first guide portion 32, and a second guide portion 33.

The user slides the controller 31 in the X axis direction when the latching of the first stopper 41 and the first battery 21 or the latching of the second stopper 42 and the second battery 22 is to be released. When the first guide portion 32 is slid, it transmits force to the first stopper 41 and the second stopper 42. More specifically, the first guide portion 32 has a pair of first inclined portions 32*c* (an example of the first converter), a pair of second inclined portions 32*a* (an example of the second converter), a linking portion 32*b*, and a pair of horizontal portions 32*d*.

The first inclined portions 32*c* are a portion that guides the first stopper 41 in the Z axis direction, and are provided slidably with the side portions 41*c* of the first stopper 41. The first inclined portions 32*c* are inclined with respect to the Z axis direction. The first inclined portions 32*c* convert movement of the release button 3 in the X axis direction into movement of the first stopper 41 in the Z axis direction.

The second inclined portions 32*a* are a portion that guides the second stopper 42 in the Z axis direction, and are provided slidably with the shaft portions 42*c* of the second stopper 42. The second inclined portions 32*a* are inclined with respect to the Z axis direction. The angle of inclination of the second inclined portions 32*a* with respect to the Z axis direction is substantially the same as the angle of inclination of the first inclined portions 32*c* with respect to the Z axis direction. The second inclined portions 32*a* are inclined with respect to the Z axis direction. The second inclined portions 32*a* convert movement of the release button 3 in the X axis direction into movement of the second stopper 42 in the Z axis direction.

The linking portion 32*b* is a portion that links the pair of first inclined portions 32*c* with the pair of second inclined portions 32*a*. The horizontal portions 32*d* extend in the X axis direction from the ends of the first inclined portions 32*c*.

When the release button 3 is slid to the X axis direction positive side, the first stopper 41 is driven to the Z axis direction negative side by the first inclined portions 32*c*, and the second stopper 42 moves to the Z axis direction negative side.

Meanwhile, since the side portions 41*c* of the first stopper 41 are disposed on the Z axis direction negative side of the horizontal portions 32*d* and the first inclined portions 32*c*, even if the first protrusion 41*b* is pressed to the Z axis direction negative side, this force is not transmitted to the second stopper 42 or the release button 3. Therefore, in a state in which the second battery 22 is mounted in the battery mounting mechanism 8, the restriction of the second battery 22 by the second stopper 42 will not be released even if the first protrusion 41*b* is pressed to the Z axis direction negative side by the second battery 22.

Also, since the shaft portions 42*c* of the second stopper 42 are disposed on the Z axis direction negative side of the second inclined portions 32*a*, even if the second protrusion 42*b* is pressed to the Z axis direction negative side, this force is not transmitted to the first stopper 41 or the release button 3. Therefore, in a state in which the first battery 21 is mounted in the battery mounting mechanism 8, the restriction of the first battery 21 by the first stopper 41 will not be released even if the second protrusion 42*b* is pressed to the Z axis direction negative side by the first battery 21 (see FIG. 13).

(5) Support Plate

As shown in FIGS. 4 and 5, the support plate 6 is disposed on the lower side of the base plate 1 (the Z axis direction negative side), and is fixed to the base plate 1 by two screws 7. The first stopper 41, the second stopper 42, the release button 3, the first spring 51, and the second spring 52 are disposed between the base plate 1 and the support plate 6.

Operation of Battery Mounting Mechanism

The operation of the battery mounting mechanism 8 will be described through reference to FIGS. 4 to 12B.

When the first battery 21 is mounted in the battery mounting mechanism 8, the first battery 21 is inserted into the recess 9 (see FIGS. 1 to 2B) and the pair of second latched portions 21*c* are mated with the pair of latching portions 13 so that the terminal part 21*a* of the first battery 21 will be connected to the terminal connector 19. At this point, since the first stopper 41 is biased to the Z axis direction positive side by the first spring 51, even though the bottom face 21*d* is in contact with the first protrusion 41*b*, the first spring 51 will contract and move the first protrusion 41*b* to the Z axis direction negative side, and the latching portions 13 will not be prevented from mating with the second latched portions 21*c*.

When the first battery 21 is moved to the X axis direction positive side and the terminal part 21*a* comes into contact with the terminal connector 19 in the X axis direction, the position of the first battery 21 in the X axis direction is determined with respect to the base plate 1. At this point, since the first stopper 41 is biased to the Z axis direction positive side by the first spring 51, the first stopper 41 moves to the Z axis direction positive side with respect to the base plate 1, and the first protrusion 41*b* mates with the first latched portion 21*b* of the first battery 21 (see FIG. 6A).

Consequently, the movement of the first battery 21 in the X axis direction with respect to the base plate 1 is restricted by the terminal connector 19 and the first stopper 41. That is, the first battery 21 is pinched by the terminal connector 19 and the first stopper 41 and locked in the X axis direction. Also, movement of the first battery 21 in the Y axis direction and the Z axis direction with respect to the base plate 1 is restricted by the latching portions 13 and the second latched portions 21*c*.

In this way the first battery 21 is mounted in the battery mounting mechanism 8.

As shown in FIGS. 12A and 12B, when the controller 31 of the release button 3 is slid to the X axis direction positive side, the first stopper 41 is pushed down to the Z axis direction negative side by the first inclined portions 32*c*, and the second stopper 42 is pushed down to the Z axis direction negative side by the second inclined portions 32*a*.

When the first stopper 41 is pushed down to the Z axis direction negative side with respect to the base plate 1, the first protrusion 41b and the second protrusion 42b move into the housing, and the first protrusion 41b is no longer in contact with the first latched portion 21b. Consequently, the latching of the first battery 21 in the X axis direction is released, and the first battery 21 can be removed to the X axis direction negative side.

When the second battery 22 is mounted in the battery mounting mechanism 8, the second battery 22 is inserted into the recess 9 (see FIGS. 1 to 2B) and the pair of second latched portions 22c are mated with the pair of latching portions 13 so that the terminal part 22a of the second battery 22 will be connected to the terminal connector 19. At this point, since the first stopper 41 is biased by the first spring 51 and the second stopper 42 by the second spring 52, both to the Z axis direction positive side, even though the bottom face 22d is in contact with the first protrusion 41b and the second protrusion 42b, the second spring 52 will contract and move the second protrusion 42b to the Z axis direction negative side, and the latching portions 13 will not be prevented from mating with the second latched portions 22c.

When the second battery 22 is moved to the X axis direction positive side and the terminal part 22a comes into contact with the terminal connector 19 in the X axis direction, the position of the second battery 22 in the X axis direction is determined with respect to the base plate 1. At this point, the first stopper 41 is stationary in a state of being pushed down to the lower side by the second battery 22, but since the second stopper 42 is biased to the Z axis direction positive side by the second spring 52, the second stopper 42 moves to the Z axis direction positive side with respect to the base plate 1, and the second protrusion 42b mates with the first latched portion 22b of the second battery 22 (see FIG. 8).

Consequently, movement of the second battery 22 in the X axis direction with respect to the base plate 1 is restricted by the terminal connector 19 and the second stopper 42. That is, the second battery 22 is pinched by the terminal connector 19 and the second stopper 42 and locked in the X axis direction. Also, movement of the second battery 22 in the Y axis direction and the Z axis direction with respect to the base plate 1 is restricted by the latching portions 13 and the second latched portions 22c.

In this way the second battery 22 is mounted in the battery mounting mechanism 8.

As shown in FIGS. 12A and 12B, when the controller 31 of the release button 3 is slid to the X axis direction positive side, the first stopper 41 is pushed down to the Z axis direction negative side by the first inclined portions 32c, and the second stopper 42 is pushed down to the Z axis direction negative side by the second inclined portions 32a.

When the second stopper 42 is pushed down to the Z axis direction negative side with respect to the base plate 1, the first protrusion 41b and the second protrusion 42b move into the housing, and the second protrusion 42b is no longer in contact with the first latched portion 22b. Consequently, the latching of the second battery 22 in the X axis direction is released, and the second battery 22 can be removed to the X axis direction negative side.

Features of Battery Mounting Mechanism

The features of the battery mounting mechanism 8 described above are compiled below.

(1)

With this battery mounting mechanism 8, when the first battery 21 is mounted in the video camera 100, movement of the first battery 21 in the X axis direction with respect to the video camera 100 (more precisely, the base plate 1) is restricted by the terminal connector 19 and the first stopper 41. When the release button 3 is operated, the first stopper 41 is driven in the Z axis direction with respect to the video camera 100, so the restriction of the first battery 21 by the first stopper 41 is released and the first battery 21 can be removed of the video camera 100.

Also, when the second battery 22 is mounted in the video camera 100, movement of the second battery 22 in the X axis direction with respect to the video camera 100 (more precisely, the base plate 1) is restricted by the terminal connector 19 and the second stopper 42. When the release button 3 is operated, the second stopper 42 is driven in the Z axis direction with respect to the video camera 100, so the restriction of the second battery 22 by the second stopper 42 is released and the second battery 22 can be removed of the video camera 100.

Thus, with this battery mounting mechanism 8, the first battery 21 and second battery 22, which have different sizes, can be mounted, and the first battery 21 and second battery 22 can be easily removed by using the release button 3.

(2)

With this battery mounting mechanism 8, since the release button 3 is disposed movably in the X axis direction with respect to the base plate 1 (such as that terminal connector 19), the direction in which the release button 3 is operated is horizontal, making the release button 3 easier to operate.

(3)

With this battery mounting mechanism 8, the release button 3 has the controller 31 that is operated by the user, the first inclined portions 32c arranged to convert movement of the controller in the X axis direction with respect to the terminal connector 19 into movement of the first stopper 41 in the Z axis direction, and the second inclined portions 32a arranged to convert movement of the controller in the X axis direction with respect to the terminal connector 19 into movement of the second stopper 42 in the Z axis direction. Accordingly, the first stopper 41 and the second stopper 42 can be driven by a simple configuration.

(4)

With this battery mounting mechanism 8, since the first protrusion 41b, which is able to come into contact with the first battery 21, is disposed more to the terminal connector 19 side than the first guide shaft 14a, if the first protrusion 41b is subjected to force in the Z axis direction when the first battery 21 is removed, the first stopper 41 will be subjected to compression force. Accordingly, there will be less elastic deformation (bending) of the first stopper 41 than when the first protrusion 41b is disposed on the opposite side from the terminal connector 19 from the first guide shaft 14a (that is, when the first stopper 41 is subjected to tensile force), and the first battery 21 will be less likely to fall out.

(5)

With this battery mounting mechanism 8, since the second protrusion 42b, which is able to come into contact with the second battery 22, is disposed more to the terminal connector 19 side than the second guide shaft 14b, if the second protrusion 42b is subjected to force in the Z axis direction when the second battery 22 is removed, the second stopper 42 will be subjected to compression force. Accordingly, there will be less elastic deformation (bending) of the second stopper 42 than when the second protrusion 42b is disposed on the opposite side from the terminal connector 19 from the second guide shaft 14b (that is, when the second stopper 42 is subjected to tensile force), and the second battery 22 will be less likely to fall out.

(6)

With this battery mounting mechanism 8, the first stopper 41 is pressed against the plate main body 11 by the first spring 51, and the second stopper 42 is pressed against the plate main body 11 by the second spring 52. Accordingly, the first stopper 41 and the second stopper 42 can be positioned by a simple configuration.

Other Embodiments

Embodiments of the present invention are not limited to the embodiment given above, and various modifications and changes are possible without departing from the gist of the present invention. Also, the embodiment given above is basically just favorable example, and is not intended to limit the present invention, its applications, or the scope of these applications.

(A)

The battery mounting mechanism discussed above can also be applied to a device other than a video camera, as long as it is a device in which batteries can be mounted. Nor is the shape of the batteries that can be mounted limited to two different kinds, and the kinds of battery that can be mounted can be increased by increasing members such as the first stopper 41 and the second stopper 42.

(B)

The terminal connector 19 and the terminal part 21a function as electrical connection terminals for the video camera 100 and the batteries, and function to position the batteries in the X axis direction, but the positioning of the batteries in the X axis direction may instead be performed by another member (such as third latching portions and third latched portions).

(C)

Movement of the first battery 21 and the second battery 22 in the Y axis direction and the Z axis direction with respect to the base plate 1 is restricted by the latching portions 13, but movement of the first battery 21 and the second battery 22 in the Y axis direction and the Z axis direction with respect to the base plate 1 may also be restricted by the first stopper 41 and the second stopper 42.

(D)

The battery mounting mechanism 8 has no lid, but a lid may be provided to protect the batteries.

(E)

The battery mounting mechanism 8 may be provided in any location or orientation with respect to the device. For example, the battery mounting mechanism 8 may be provided to a side face of the video camera 100, and the direction in which the batteries are removed may be the Y axis direction or the Z axis direction, rather than on the X axis direction negative side.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A battery mounting mechanism for mounting a first battery and a second battery having mounting surfaces of different sizes in an apparatus main body, said battery mounting mechanism comprising:
    a first contact part configured so as to be fixed to the apparatus main body and capable of coming into contact with the first and second batteries in a first direction;
    a first support member arranged to restrict movement of the first battery in the first direction with respect to the apparatus main body along with the first contact part, and configured to be movable in a second direction perpendicular to the first direction with respect to the first contact part;
    a second support member arranged to restrict movement of the second battery in the first direction with respect to the apparatus main body along with the first contact part, and configured to be movable in the second direction with respect to the first contact part; and
    a release member arranged to release the restriction of the first battery by the first support member or the restriction of the second battery by the second support member, and able to drive the first support member and the second support member in the second direction with respect to the first contact part.

2. The battery mounting mechanism according to claim 1, wherein
    the first support member is disposed between the second support member and the first contact part.

3. The battery mounting mechanism according to claim 2, wherein
    the release member is configured to be movable in the first direction with respect to the first contact part.

4. The battery mounting mechanism according to claim 3, wherein
    the release member has a controller arranged to be operated by a user, a first converter arranged so as to be capable of converting movement of the controller in the first direction with respect to the first contact part into movement of the first support member in the second direction, and a second converter arranged so as to be capable of converting movement of the controller in the first direction with respect to the first contact part into movement of the second support member in the second direction.

5. The battery mounting mechanism according to claim 4, further comprising
    a first guide member supporting the first support member movably in the second direction with respect to the first contact part,
    wherein the first support member has a first main body supported movably in the second direction by the first guide member, and a first restrictor disposed more to the first contact part side than the first guide member and capable of coming into contact with the battery.

6. The battery mounting mechanism according to claim 5, further comprising
    a second guide member supporting the second support member movably in the second direction with respect to the first contact part,
    wherein the second support member has a second main body supported movably in the second direction by the second guide member, and a second restrictor disposed more to the first contact part side than the second guide member and capable of coming into contact with the battery.

7. The battery mounting mechanism according to claim 6, further comprising
a second contact part capable of coming into contact with the battery in the second direction;
a first pressing member arranged to bias the first support member in the second direction and press the first support member against the second contact part; and
a second pressing member arranged to bias the second support member in the second direction and press the second support member against the second contact part.

8. The battery mounting mechanism according to claim 1, wherein
the release member is disposed so as to be moveable in the first direction with respect to the first contact part.

9. The battery mounting mechanism according to claim 8, wherein
the release member has a controller arranged to be operated by a user, a first converter arranged so as to be capable of converting movement of the controller in the first direction with respect to the first contact part into movement of the first support member in the second direction, and a second converter arranged so as to be capable of converting movement of the controller in the first direction with respect to the first contact part into movement of the second support member in the second direction.

10. The battery mounting mechanism according to claim 9, further comprising
a first guide member supporting the first support member movably in the second direction with respect to the first contact part,
wherein the first support member has a first main body supported movably in the second direction by the first guide member, and a first restrictor disposed more to the first contact part side than the first guide member and capable of coming into contact with the battery.

11. The battery mounting mechanism according to claim 10, further comprising
a second guide member supporting the second support member movably in the second direction with respect to the first contact part,
wherein the second support member has a second main body supported movably in the second direction by the second guide member, and a second restrictor disposed more to the first contact part side than the second guide member and capable of coming into contact with the battery.

12. The battery mounting mechanism according to claim 11, further comprising
a second contact part capable of coming into contact with the battery in the second direction;
a first pressing member arranged to bias the first support member in the second direction and press the first support member against the second contact part; and
a second pressing member arranged to bias the second support member in the second direction and press the second support member against the second contact part.

13. The battery mounting mechanism according to claim 1, wherein
the release member has a controller arranged to be operated by a user, a first converter arranged so as to be capable of converting movement of the controller in the first direction with respect to the first contact part into movement of the first support member in the second direction, and a second converter arranged so as to be capable of converting movement of the controller in the first direction with respect to the first contact part into movement of the second support member in the second direction.

14. The battery mounting mechanism according to claim 13, further comprising
a first guide member supporting the first support member movably in the second direction with respect to the first contact part,
wherein the first support member has a first main body supported movably in the second direction by the first guide member, and a first restrictor disposed more to the first contact part side than the first guide member and capable of coming into contact with the battery.

15. The battery mounting mechanism according to claim 14, further comprising
a second guide member supporting the second support member movably in the second direction with respect to the first contact part,
wherein the second support member has a second main body supported movably in the second direction by the second guide member, and a second restrictor disposed more to the first contact part side than the second guide member and capable of coming into contact with the battery.

16. The battery mounting mechanism according to claim 15, further comprising
a second contact part capable of coming into contact with the battery in the second direction;
a first press member arranged to bias the first support member in the second direction and pressing the first support member against the second contact part; and
a second press member arranged to bias the second support member in the second direction and pressing the second support member against the second contact part.

17. The battery mounting mechanism according to claim 1, further comprising
a first guide member supporting the first support member movably in the second direction with respect to the first contact part,
wherein the first support member has a first main body supported movably in the second direction by the first guide member, and a first restrictor disposed more to the first contact part side than the first guide member and capable of coming into contact with the battery.

18. The battery mounting mechanism according to claim 17, further comprising
a second guide member supporting the second support member movably in the second direction with respect to the first contact part,
wherein the second support member has a second main body supported movably in the second direction by the second guide member, and a second restrictor disposed more to the first contact part side than the second guide member and capable of coming into contact with the battery.

19. The battery mounting mechanism according to claim 18, further comprising
a second contact part capable of coming into contact with the battery in the second direction;
a first press member arranged to bias the first support member in the second direction and pressing the first support member against the second contact part; and
a second pressing member arranged to bias the second support member in the second direction and press the second support member against the second contact part.

20. The battery mounting mechanism according to claim 1, further comprising
a second guide member supporting the second support member movably in the second direction with respect to the first contact part, wherein the second support member has a second main body supported movably in the second direction by the second guide member, and a second restrictor disposed more to the first contact part side than the second guide member and capable of coming into contact with the battery.

21. The battery mounting mechanism according to claim 1, wherein the first support member and the second support member are configured and arranged such that when the first support member is in contact with the first battery, the second support member is spaced apart from the first battery.

22. The battery mounting mechanism according to claim 1, wherein the first and second battery support members are configured and arranged such that when the second support member is in contact with the second battery, the first support member is moved in the second direction.

* * * * *